3,000,298
PRINTING BY DIAZOTIZATION
William C. Bryant, Lombard, and Herbert P. Sherman, Chicago, Ill.; said Bryant assignor to said Sherman
No Drawing. Filed Dec. 17, 1956, Ser. No. 628,560
10 Claims. (Cl. 101—129)

This application is in part a continuation of our patent application Ser. No. 557,213, filed January 3, 1956, now abandoned.

Our invention pertains to the art of printing by chemical reaction on the surface of material to which a mark is to be applied, hereinafter called a base, as distinguished from the direct application of pigment to a surface, and, while especially designed for printing on paper, as in a stencil duplicating process or the like, our invention may be employed in the application of coloring matter to a wide variety of materials, including wood and other cellulosic products, leather, textile fibers including cotton, wool and synthetics, and various other printable materials.

Our invention utilizes the general principles of the diazo-dye process, namely, a process wherein an azo dye is formed by the reaction of a diazo component and a coupler. The azo dyes are characterized by the presence of the chromophore group —N:N—. According to the diazo-dye process, the coupler is usually an aromatic amine, a phenol or other well known coupling compounds, the multi-ring couplers usually giving the most stable end products. In the diazo-dye process the diazo compound may be formed in situ by the reaction of nitrous acid on a diazotizable amine, the nitrous acid being produced, for example, by the reaction of an acid and a substance, such as nitrite, which yields nitrous acid in an acidic medium.

We realize that this principle has heretofore been suggested for printing, as, for example, in Murray Patents 1,509,872, September 30, 1924, and 1,514,222, November 4, 1924. According to these Murray patents, an azo color is produced on paper by causing diazotization and coupling to take place on the paper. This is accomplished by applying to the surface of the paper at different times different solutions containing an amine, a nitrite, an acid and a "developer," the nitrite and amine being applied at one time and the acid and developer at another time. In Patent 1,509,872 Murray suggests the addition of an oil base as a vehicle containing a free fatty acid to insure penetration of the coloring matter into the paper, a result which we wish to avoid, as such penetration causes "feathering" of the impression.

In Patent 2,597,306, May 20, 1952, Eaton discloses utilization of the diazo-dye process in a printing process utilizing moist ammonia gas or other alkali in the coupling reaction, the ammonia serving to "develop" the dye by neutralizing the stabilizing acids present with the diazo and coupler components and thus to effect the coupling and produce the desired image.

This type of reaction has been suggested for printing not only by means of a stencil but also by the well known "hectograph" system, wherein one of the reagents is transferred to the paper from the surface of a gelatinous base, as disclosed, for example, in Klimkowski Patent 2,634,677, April 14, 1953.

An object of our invention is to achieve a printing method which will produce an azo color on a base, such as a sheet of paper, textile or other material, and which will avoid certain of the major disadvantages of the prior art, which method will be relatively inexpensive, quick and simple in operation, and which will produce a fast, permanent color of suitable hue.

More particularly, it is our desire, among other objectives, to avoid excessive penetration of the base, as distinguished from Murray, described above. According to our invention, we achieve a relatively fine-line impression on the base surface.

According to our invention, in one embodiment nitrite is incorporated in the surface of the paper or other base which is to be "printed," and all of the other ingredients taking part in the reaction are later applied as the color composition or "ink" in the "printing" operation in such form that the coupling reaction takes place within the body of the base. During the reaction, the acid reacts with the nitrite to form nitrous acid, the nitrous acid reacts with the diazotizable amine to form a diazo compound and the diazo compound in turn couples with the coupler to produce the dye.

In another embodiment the acid component is incorporated in the paper surface, while the nitrite along with the organic reagents provides the coloring composition or "ink" to be applied later to the surface in the printing operation.

In the diazo-dye process, as generally practiced, the diazo compound reacts with the coupler in approximately molecular equivalent or greater concentrations of the diazo salt or base with respect to the coupler.

In our invention this relation is reversed in that we employ an excess of coupler of from double up to approximately twelve times its stoichiometric ratio with the diazotizable amine or "dye base," in order to assure full development of the base after diazotizing and thus prevent degradation of the diazo salt and its subsequent oxidation by the air, to the detriment of the developed color. The amount of this excess of coupler will depend in each case on the specific coupler and dye base employed. The amine compounds which on oxidation produce high colored products or when diazotized will degrade to a highly colored product, require higher coupler concentrations than those amines which degrade either before or after diazotizing to colorless or less highly colored materials.

Our invention in both embodiments is further characterized by the fact that we employ a great excess of nitrite, from two to ten times, and preferably about four to eight times the stoichiometric quantity required to produce the required amount of nitrous acid, in order to assure complete diazotization. This great excess is present in the paper or other base in one embodiment and in the coloring composition in another embodiment.

Inasmuch as a major application contemplated for our invention is in the printing and duplicating field, one of our principal objectives is to provide a printing composition whch will have exceptionally high stability as compared with the compositions used in the dyeing and color-printing industry, in order that our product may have a long shelf life. This result is accomplished by using the amine and coupler in a solution of low water content, wherein degradation of the amine is inhibited and true solution of the coupler is accomplished.

Furthermore, it is highly desirable that compounds used as contemplated by us must not injure the metal or plastic parts of duplicating machines with which they are likely to come in contact. We have found that the acids usually used in the diazotization reaction are much too active with respect to metals, resulting in attack of metal parts and consequent formation of metal salts, to the detriment of the stability of the system.

According to one embodiment of our invention, we have discovered that glycerine may be employed as a solvent for the acid, with many attendant advantages. Thus, we produce an acid system which will be considerably less reactive to metals and other materials than the acids usually employed but at the same time being active enough to react with sodium nitrite to accomplish diazotization. Furthermore, our use of glycerine as a solvent avoids adversely affecting nitrocellulose, the most commonly encountered plastic in preferred applications of our process. Our use of glycerine, furthermore, permits control of the reaction speed at a moderate pace at room temperatures in a practically anhydrous medium.

We find that we can also accomplish the coupling reaction in certain embodiments in a non-alcoholic as well as non-aqueous system by using water-in-oil emulsions and even waterless compositions in the coupling reaction.

Our invention contemplates the utilization of diazotates and iso-diazotates as well as diazonium salts in the manner herein described. In fact, the diazotates and iso-diazotates are preferred for higher stability, and multi-ring compounds are preferred for the same reason.

EMBODIMENT I

We will now describe our method wherein the base is impregnated with nitrite.

Coloring composition

The diazotizable aromatic amine is dispersed in a cold glycerine solution of acid, preferably boric, and suitable wetting agents are then added for the purpose of promoting penetration of the fluid or paste into the base fibers to assure rapid release of nitrous acid from the nitrite and speedy diazotization. Boric acid is preferred because of its relatively high boiling point and low oxidizing power. Other acids, such as oleic, phosphoric or a substituted phosphoric acid or glycerine-soluble organic acids having properties similar to those just mentioned for boric, may be used in lieu thereof. The coupler is then dispersed in the glycerine solution and followed by the addition of a diluent in the form of a mineral or fatty oil. The material is then homogenized in the usual manner and is then ready for use, except for any desired adjustment of viscosity or consistency. The mineral oil is selected from those having viscosities in the range of from 60 to 4000/100° F., S.S.V. The fatty oils are selected from the group of fixed oils and the partial glycerine, sorbital, mannitol and glycol type esters of fatty acids.

Base treatment

Where paper is the base to be employed, an absorbent or unsized surface type is desired. It is also highly desirable that the paper or other base shall have been freed of all residual bleaching agents and other impurities such as sulfite, either in the sheet or in the pulp prior to felting of the paper on the paper machine. It is preferred that the paper employed in this embodiment of our invention shall have a pH value of over 7, preferably from about 7 to 9.

Paper of the character outlined above, or other suitable base, is treated with a nitrite salt, preferably sodium, although other water- or alcohol-soluble nitrites may be used. The nitrite is preferably laid down in about a 5 to 20% water or alcohol solution in a thin film on the surface of the dried paper by any conventional surface-treating technique, such as spraying, roller, doctor blade, etc. The nitrite should not penetrate much below the surface of the sheet. If sufficient nitrite is impregnated into the surface, the dyestuff will be completely diazotized and coupled before the mass of the impression can strike too deeply into the body of the paper, thus preventing "strike-through" of the color and giving a better job of diazotization and hence better color development.

Printing

The coloring composition described above, in a preferred application of our invention, is placed in the ink receptacle of a printing or duplicating machine, such as a so-called mimeograph machine, which prints through a stencil. The paper, which has been treated with nitrite as described above, is feed through the machine with the treated face in position to receive the application of the coloring compound.

We find that within an average of six to twelve seconds of the application of the coloring compound to the paper the printed impression will have been sufficiently developed to produce such legibility as will permit editing of the copy, while the lapse of one to two minutes after printing will produce full color development.

Glycero-boric acid

Seven parts boric acid are dissolved in 30 parts glycerine and the mixture is gently warmed to no more than 190° F., with constant stirring to prevent overheating at the bottom of the container. Excessive heat will produce esterification rather than solution of the boric acid, thus detracting from the reactivity of the finished solution.

Coloring composition (fluid-blue-black)

300 parts glycero-boric acid Cold (less than 100° F.)
18 parts 5-amino-2-benzoylamino-1, 4-diethoxybenzene
180 parts polyethylene oxide sorbitan mono-oleate
144 parts o-toluidide of 2,3-oxynaphthoic acid
312 parts 1000/100° F. SUV Coastal oil
30 parts water
90 parts polyethoxy nonylphenol
90 parts water
144 parts Vanlube #26 (a proprietary metal passivator of the R. T. Vanderbilt Co., New York, N.Y).

The components are added to the kettle in the above sequence, using absolutely no heat in the process. After through mixing following the final addition, the whole mass is passed over a three-roll ink mill with a moderately loose setting, particularly on the third (take-off) roll. Then add 133 parts titanium dioxide pigment. The whole mass is then passed through a homogenizer, such as a Marco or a Manton-Caulin, set at about 200 pounds per square inch back pressure.

The material is now finished and ready to use as a coloring composition or "ink" in the manner described above.

It will be readily understood by those skilled in the art that we may substitute for the ingredients specified above a wide variety of other components known to produce azo colors when coupled in the diazo-dye process. For example, we have found that we can employ o-dianisidine, stabilized with a metal chloride, such as zinc, tin or aluminum, and in the form of a water-in-oil emulsion.

Acidity control, using ordinary paper

As stated above, the paper to be employed in the practice of our invention may be specially treated in the mill to eliminate substantially all impurities, especially sulfite and bleach. Occluded and adsorbed oxygen within the cellulose fibers should be destroyed or inactivated for the successful operation of our invention.

We find that ordinary paper as it comes from the mill, provided it has the desired physical characteristics, may be satisfactorily used by adjusting the coloring composition to a higher acidity than would normally be used to accomplish the reaction. We may achieve this by several methods.

According to one procedure, we may add boric acid up to an excess of about 10% to 40% of the basic formula, preferably about 20%. In lieu of boric acid we may use practically any non-volatile organic acid which is normally solid at room temperature and soluble in water or glycerine, and especially citric, tartaric or oxalic acid.

According to another system, we may use a substituted phosphoric acid such as octyl-di-acid-o-phosphate, dioctyl acid-o-phosphate, lauryl-di-acid-o-phosphate or other phosphoric acid esters wherein the acid is incompletely esterified, so that all of the primary hydrogen has been removed from possible reaction but the compound has at least one of the remaining two hydrogens available. We have also found that a mixture of boric and a substituted phosphoric acid may be employed.

An example of the boric acid system is as follows:

*Base*

50 parts glycero-boric acid
6 parts 5-amino-2-benzoylamino-1,4-diethoxy benzene
15 parts polyethylene oxide sorbitan monooleate
24 parts o-toluidide of 2,3 oxynaphthoic acid
15 parts glycerine
100 parts 1000/100° F. SUV Coastal oil
25 parts Vanlube 26

One hundred parts of the above described base are combined with 30 parts of boric acid powder, and this mixture is passed over a three-roll ink mill to assure complete dispersion of the dry acid. To this thoroughly mixed material is then added and mixed in the following mixture:

7 parts polyethylene oxide sorbitan monooleate
14 parts water
8 parts glycerine

An example of the phosphoric acid type of system is as follows:

In the formula for coloring composition shown in column 4, substitute for the first ingredient:

75 parts phosphoric acid (85%)
225 parts glycerine

As an example of the mixed acid system, we may take 100 parts of the boric acid base described above and 30 parts boric acid powder and grind in an ink mill, as described above, and then add:

7 parts polyethylene oxide sorbitan monooleate
14 parts water
8 parts glycerine

After these ingredients are thoroughly mixed, we then add and mix in:

10 parts octyl-di-acid-o-phosphate
2 parts water
4 parts polyethylene oxide sorbitan monooleate

EMBODIMENT II

In another embodiment of our invention, instead of the paper or other base being first impregnated with nitrite and all of the other components of the diazo-dye reaction being incorporated in what we have called the coloring composition or "ink," we incorporate an acid in the surface of the paper or other base and apply the nitrite along with the other components in the coloring composition to be applied to the base in the so-called printing operation. In this embodiment, we may incorporate in the coloring composition, as a source of nitrous acid, either a nitrite, as described above for use in the base, or a water- or alcohol-soluble nitroso amine. For example, we may use diethanol, diethyl or dimethyl nitroso amine, or mixtures thereof. This embodiment of our invention has a number of important features in common with the embodiment described above and a number of additional advantages. For example, we find that a paper or other base impregnated with acid will be stable under a greater variety of atmospheric conditions than a nitrite treated paper.

Also, with the nitrite incorporated in the coloring compound, one may use an amine rather than its salt, thus obviating oxidation of the salt which yields a chromotrope, causing change in the developed color if the amine salt is not completely diazotized. Amine oxidation products, furthermore, can give color bodies on simple air oxidation which will more or less permanently stain cellulosic material.

The coloring composition must necessarily be alkaline to prevent formation of nitrous acid, and this condition is advantageous for a number of reasons. For one thing, there need be no concern as to possible reaction with metal of equipment, the amines here acting as passivators of the metal surfaces.

Also, if any of the coloring composition should accidentally contact the human body, clothing or equipment, it may be readily removed by water.

*General description*

A diazotizable amine is dissolved in an alkaline solution of the coupler. It is desirable to use a highly alkaline solution where the solvent is an alcohol of the monohydroxy type, inasmuch as the usual naphthol types of couplers are insoluble in most solvents.

Aqueous alkali solutions may be used in the emulsion if wetting or dispersing agents are employed as synergists. We have found that several relatively new types of emulsifiers can be employed in our system which act as solvents for the naphthols by the use of organic alkalies, with or without the use of alcohols and/or water, such as polyethylene oxide condensation products of alkyl phenols and polyethylene condensation products of partial fatty esters.

The main body or continuous phase of the fluid may be any non-aqueous substance with which the coupler-amine solution is compatible. We have used mineral oil-petroleum sulphonate solutions for this phase, as well as organic alkali soaps in solution in mineral oil, as well as organic amine salts in solution in polyhydroxy alcohols. This latter system is the one we prefer.

Where an inorganic nitrite is used, it is dissolved in the least water which will allow complete distribution of the salt. No water is necessary for the organic nitrites. According to our system diazotization can take place in the polyol phase.

*Example (blue-black color)*

PART I 1000 parts glycerine
150 parts ethylene glycol
375 parts oleic acid
150 parts diethanol amine The first three ingredients are cold-mixed. The amine is added while stirring, the stirring being continued after complete addition until the mass is clear and homogeneous.

PART II 180 parts polyethylene oxide condensate of sorbitan mono-oleate
30 parts 5-amino-2-benzoylamino-1,4 diethoxybenzene
7.5 parts phloroglucinol
60 parts o-toluidide of 2,3-oxynaphthoic acid
50 parts diethanol amine The dry ingredients are added to the condensate of sorbitan mono-oleate, and mixed well. After the dry materials are uniformly dispersed in the liquid, add the amine. Heat the total mixture to 120–140° F. with continuous stirring. When the solution of the dry ingredients is complete, add to Part I with continuous stirring of the mixture.

PART III

To the mixture of Parts I and II is added:

205 parts calcium silicate or the like in fine mesh form

The mixture is stirred thoroughly to completely disperse the silicate. The mass is then passed over an ink mill or through a homogenizer. Then to the mass is added

PART IV 75 parts sodium nitrite dissolved in
150 parts water

Mix well. The fluid thus produced is now ready for use.

To produce a satisfactory purple-black, we may use as couplers an aryl amide of 2,3-oxynaphthoic acid or beta-naphthol along with one of the phenolic compounds, such as phenol, resorcinol or phloroglucinol, preferably the latter. A preferred embodiment of this formula is as follows:

Part I:
    150 parts ethylene glycol
    1000 parts glycerine
    375 parts oleic acid
    150 parts diethanol amine
Part II:
    300 parts sorbitan monooleate ethylene oxide condensate
    30 parts o-dianisidine
    7.5 parts phloroglucinol
    60 parts beta-naphthol
    20 parts diethanol amine
Part III: 205 parts calcium silicate or its like
Part IV:
    75 parts sodium nitrite dissolved in
    150 parts water We may produce a satisfactory brown by following the above purple-black formula except for the substitution in part II of the following dyestuff bases:

30 parts 5-amino-2-benzoylamino-1,4 diethoxybenzene
75 parts dioxydinaphthoyl dianisidine For a mauve color we may follow the same procedure except for the substitution in Part II of the following dyestuff bases:

30 parts 5-amino-2-benzoylamino-1,4 diethoxybenzene
65 parts beta-naphthol

For a green color we may follow the same procedure except for the substitution in Part II of the following dyestuff bases:

30 parts 5-amino-2-benzoylamino-1,4 diethoxybenzene
85 parts anilide or toluidile of 2,3-oxanthracene carboxylic acid For a red color we may follow the same procedure except for the substitution in Part II of the following dyestuff bases:

20 parts p-chloro-o-nitraniline
80 parts anilide of 2,3 oxynaphthoic acid

The manufacturing procedure is the same for all these various colors as for the black dye described above.

*Base treatment*

The same types of base materials as described above, such as paper, etc., may be colored or printed by this method as in the first embodiment. If any impurity is present in the base material, it may be removed as described above, care being taken that no agent be employed which is oxidizing in nature or which will form sulphonic esters or salts with the base material. If a mineral acid is used for purification, one should exclude sulphuric and any of the per-acids as well as nitric. One may employ hydrochloric or phosphoric acid and any organic or inorganic alkali. Any bleaching agent present in the base material except oxalic acid should be destroyed before the "printing" operation.

Selection of the proper acid for incorporation in the paper or other base is important, inasmuch as the reaction producing the color-forming azo compound is predicated on the acid which yields the nitrous acid, and this reaction takes place in or on the base material. Certain of the acids which must be avoided are noted above.

The paper or other base on which the image is to be printed may have incorporated therein either an acid as previously described or an acid salt such at $Na_2H_2P_2O_7$, $NaH_2PO_4$ or $NaHC_2O_4$, or the corresponding potassium salts, or an alkali metal salt of the polycarboxylic organic acids wherein only one carboxyl group has been neutralized or only one such group is free to function as an acid. Alternatively, the base surface may be treated with a salt of a weak base and a strong acid, provided the vapor tension of the salt is low at room temperature. Examples of such salts are aluminum chloride, zinc chloride, aluminum sulfate, calcium chloride, etc.

It should be understood, therefore, that our use of the term "acid" in this connection in the claims is intended to include not only acids, strictly speaking, but also those substances as we have indicated in this specification as interchangeable therewith in practicing our invention.

Examples of acid salts which we may employ are:

$KHSO_4$
$NaHSO_4$
$KH_2PO_4$ and Na salt
$K_2HPO_4$ and Na salt
$KH_3P_2O_7$ and Na salt
$K_2H_2P_2O_7$ and Na salt
$K_3HP_2O_7$ and Na salt and Mono sodium citrate
Mono sodium tartrate
Mono sodium oxalate, etc.

The acidic chemical, as illustrated by the various examples described above, may be incorporated in the ingredients from which the paper or other base composition is to be manufactured, as, for example, in the beater; or it may be added to the wet end of the paper machine wherein the chemical is absorbed or adsorbed by the pulp dispersion immediately before being laid down on the wire; or it may be added to the sizing composition applied at the tub of the size press or roller, at which point the amount of the chemical applied to the surface of the paper is controlled by the nip of the roller pressure, and the depth of penetration of the chemicals is likewise so controlled.

The following are examples of water- or alcohol-soluble acids which may be incorporated into the base material as a total impregnant or as a surface treatment:

Oxalic
Tartaric
Citric
Malonic
Malic
Maleic
Oleic
Boric
Phosphoric acid salts (mono- and di-acidic)

Various other acids may be employed so long as they meet the conditions outlined above and have relatively low volatility.

The acid in about a 3% to 30% solution is applied to the surface of the base in the same manner that the nitrite is applied in the first described embodiment. The concentration of the acid is directly proportional to its molecular weight.

EMBODIMENT III

In another embodiment of our invention we achieve a composition for use as a coloring composition which is specially designed for greatly increased shelf life. In this composition we are able to prevent premature development such as might under certain conditions result from the use of excess coupler, the coupler normally being a very mild acid.

In the embodiment about to be described a two-step neutralization procedure is accomplished between the amine, which is normally alkaline, and the coupler, which is acid.

We have found that the amines and couplers may be dissolved in partial gylceryl esters of fatty acids such as glyceryl mono-oleate, stearate, laurate and tallate compounds which we have found desirable in our invention, at elevated temperatures, say within the range of approximately 300–320° F. In such a solution, as described in detail herebelow, the amine is neutralized. It will be noted that there is more coupler present in the formulation than is required to neutralize the diazotizable amine. The acidity of the excess coupler is then neutralized by the addition of a predetermined excess of an alkyl or alkylol amine such as mono-, di- or tri-methyl, ethyl or butyl amines, etc., thus providing the desired alkalinity and greatly enhancing the stability of the entire composition.

*Example (black color)*

A base is prepared by mixing together the following materials:

26 lbs., 4 oz. gylceryl mono-oleate
5 lbs., 13 oz. ethoxylated nonyl phenol
4 lbs., 13oz. 5-amino-2-benzoylamino-1,4 diethoxybenzene
9 lbs., 13 oz. o-toluidide of 2,3 oxynaphthoic acid.

The above mixture is brought to a temperature of about 310° F. and held to approximately that temperature until the solids have completely dissolved, whereupon is added 4 lbs., 5 oz diethanolamine The mixture, after being held at about 310° F. for at least 10 minutes, is added to 57 lbs., 1200/100° F. SSU mineral oil which is an unblended bright stock.

The mixture thus obtained is rapidly agitated and to it there is then added rapidly with continued agitation the following solution:

19 lbs. 13 oz. sodium nitrate
29 lbs. 4 oz. water

When this mixture has been completed, there is added slowly and in small additions:

35 lbs. calcium silicate of the diatomaceous type

After such addition has been completed the mixing is continued for about one hour without further addition of heat in order to assure complete wetting out of the insoluble material (calcium silicate). It will be understood that the calcium silicate is used only as a filler and anti-feathering agent. The mixture is allowed to cool to room temperature.

The mixture obtained as described above is ground by suitable means such as a three- or five-roll ink mill, preferably to a fineness of less than 2 on the ink scale. The color of the finished coloring composition may be modified by allowing the mixture to stand before grinding, although this has no effect on the color of the diazotized material.

Of the base prepared as described above, about 175 parts by weight are added to:

57 parts 2000–2400/100° F. unblended bright stock.

After thorough mixing, add in sequence an with continuous agitation:

11 parts ethylene gylcol
36¾ parts gylcerine
5¼ parts Vanlube 26 (a proprietary composition of the R. T. Vanderbilt Co., New York City, composed of amines and thiuram type materials which act as antioxidants and metal sequestering agents)

For the purpose of further controlling the tint of the tint of the coloring composition we add from 4.5 to 9 parts by weight of a "tint control agent" consisting of 18 pounds of titanium dioxide and 6 pounds glyceryl mono-oleate, ground to less than 1 gauge on the ink scale.

The material is completed by adding the materials described below and preferably in the sequence here indicated, parts being given by weight, viz:

| | Parts |
|---|---|
| 2000–2400/100° F. unblended bright stock | 30 |
| Water | 8 |
| 2000–2400/100° F. unblended bright stock | 43 |
| Ethoxylated sorbitan mono oleate | 15 |
| Ethylene glycol | 8 |
| 2000–2400/100° F. unblended bright stock | 12 |
| Ethoxylated sorbitan mono oleate | 4 |
| Sodium nitrite solution of the same strength as that used in the ground base described above | 21 |
| Ethylene glycol | 4½ |
| Kerosine (150° F. flash point min., Cleveland open cup method) | 7 |
| 2000–2400/100° F. unblended bright stock | 12 |

The color of the finally developed diazotized material on the paper or other base may be varied from deep blue to jet black by finally adding 7 to 12 parts by weight of a solution of 2 pounds of phloroglucinol in 10.5 pounds of glycerine, the greater such addition the deeper the black.

Production control from the standpoint of viscosity, emulsion stability and laid-on color may lie in varying the amounts of the ethoxylated sorbitan mono-oleate, kerosine and unblended bright stock. Further control variations may be made, as indicated above, in the quantities of phloroglucinol solution, tinting agent and water.

Various changes coming within the spirit of out invention may suggest themselves to those skilled in the art. Hence, we do not wish to be limited to the specific embodiments shown and described or uses mentioned, but intend the same to be merely exemplary, the scope of our invention being limited only by the appended claims.

We claim:

1. A method of stencil printing utilizing the diazo-dye process comprising providing a dry porous base sheet having a high concentration available at a surface thereof of a material selected from the class consisting of a relatively non-volatile, substantially non-oxidizing acid and a substance which yields nitrous acid in an acidic medium, applying to said surface while the latter is dry, through a stencil, a coloring composition comprising a diazotizable amine, a coupler, and the other member of said first named class whereby the nitrous acid yielding substance reacts with said acid to liberate nitrous acid, the nitrous acid diazotizes the amine and the diazotized amine reacts with the coupler to produce an azo-dye, said substance which yields nitrous acid being present in an amount from about 2 to 10 times the stoichiometric quantity in order to assure complete diazotization of the amine, said coupler being present in an amount between about 2 to 12 times the stoichiometric quantity in order to assure full coupling of the diazotized amine thereby avoiding the presence on the base, after the reaction, of diazotized amine, the reactants reacting at said surface so that the formation of the dye is substantially restricted to said surface whereby a fine line image is obtained.

2. A method as defined in claim 1 wherein the acid is provided in the base and the acid is a solid material.

3. A method as defined in claim 1 wherein the material on said base is the nitrous acid yielding substance and wherein said coloring composition includes the acid.

4. A method as defined in claim 3 wherein the coloring composition includes glycerine as a solvent for said acid.

5. A method as defined in claim 4 wherein said acid comprises boric acid.

6. A method as defined in claim 5 wherein the base is a felted cellulosic sheet substantially free of non-cellulosic impurities comprising sulfite, bleach, and active occluded and adsorbed oxygen.

7. A method as defined in claim 1 wherein the coloring composition contains not more than a minor portion of water.

8. A method as defined in claim 1 wherein the nitrous acid yielding substance is incorporated in said sheet and wherein the coloring composition contains the acid in an amount substantially in excess of the stoichiometric amount of acid necessary for the diazotizing reaction.

9. A method as defined in claim 1 wherein the coloring composition includes a finely divided solid filler.

10. A method as defined in claim 1 wherein the material on the base is provided substantially only on the surface thereof.

References Cited in the file of this patent

UNITED STATES PATENTS

| | | |
|---|---|---|
| 210,690 | Hawke | Dec. 10, 1878 |
| 798,528 | Ostwald | Aug. 29, 1905 |
| 928,450 | Hochstetter | July 10, 1909 |
| 970,439 | Fuerth | Sept. 13, 1910 |
| 1,509,872 | Murray | Sept. 30, 1924 |
| 1,514,222 | Murray | Nov. 4, 1929 |
| 1,781,902 | Gill | Nov. 18, 1930 |
| 1,870,498 | Ellner | Aug. 9, 1932 |
| 2,146,976 | Neidich | Feb. 14, 1939 |
| 2,349,561 | Reynolds | May 23, 1944 |
| 2,361,505 | Sheridon | Oct. 31, 1944 |
| 2,597,306 | Eaton | May 20, 1952 |
| 2,598,332 | Walton | May 27, 1952 |
| 2,634,677 | Klimkowski et al. | Apr. 14, 1953 |
| 2,654,673 | Steinhardt | Oct. 3, 1953 |
| 2,839,412 | Igler | June 17, 1958 |
| 2,873,668 | Klimkowski et al. | Feb. 17, 1959 |

FOREIGN PATENTS

| | | |
|---|---|---|
| 687,808 | Great Britain | Feb. 18, 1950 |